US 8,693,229 B2

(12) United States Patent
Saeki et al.

(10) Patent No.: US 8,693,229 B2
(45) Date of Patent: Apr. 8, 2014

(54) POWER REGENERATION APPARATUS AND POWER CONVERSION APPARATUS (71) Applicant: Kabushiki Kaisha Yaskawa Denki, Kitakyushu (JP)

(72) Inventors: Takahiro Saeki, Kitakyushu (JP); Hideaki Iura, Kitakyushu (JP); Shoji Konakahara, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/858,949

(22) Filed: Apr. 9, 2013

(65) Prior Publication Data
US 2013/0279213 A1  Oct. 24, 2013

(30) Foreign Application Priority Data
Apr. 20, 2012  (JP) .................... 2012-097074

(51) Int. Cl.
*H02M 3/24* (2006.01)
(52) U.S. Cl.
USPC .............................................. 363/98; 363/40
(58) Field of Classification Search
USPC ........................ 363/39–41, 98, 132
See application file for complete search history.

(56) References Cited

U.S. PATENT DOCUMENTS

| 6,972,541 | B2 * | 12/2005 | Matsushiro et al. | 318/801 |
| 7,649,758 | B2 * | 1/2010 | Taimela et al. | 363/98 |
| 7,746,671 | B2 * | 6/2010 | Radecker et al. | 363/21.03 |
| 2012/0106217 | A1 * | 5/2012 | Sakakibara | 363/126 |
| 2013/0214708 | A1 * | 8/2013 | Saeki et al. | 318/376 |
| 2013/0279214 | A1 * | 10/2013 | Takase et al. | 363/37 |

FOREIGN PATENT DOCUMENTS

JP  2011-101473  5/2011

* cited by examiner

*Primary Examiner* — Jessica Han
(74) *Attorney, Agent, or Firm* — Ditthavong Mori & Steiner, P.C.

(57) ABSTRACT

A power regeneration apparatus includes a power conversion unit, an AC reactor, a voltage detecting unit, a phase detecting unit, a drive control unit for controlling the power conversion unit based on a phase detection value, and a reactive current component detecting unit. The phase detecting unit detects the phase of the AC power supply. The reactive current component detecting unit detects a reactive current component of a current. The drive control unit includes a phase correction section. The phase correction section corrects the phase detection value based on the reactive current component.

9 Claims, 11 Drawing Sheets

POWER REGENERATION APPARATUS AND POWER CONVERSION APPARATUS

CROSS-REFERENCE TO RELATED APPLICATION

The present application claims priority under 35 U.S.C. §119 to Japanese Patent Application No. 2012-097074, filed Apr. 20, 2012. The contents of this application are incorporated herein by reference in their entirety.

BACKGROUND

1. Technical Field

The embodiments disclosed herein relate to a power regeneration apparatus and a power conversion apparatus.

2. Related Art

A power regenerative converter is conventionally known as a power regeneration apparatus. The power regenerative converter is arranged, for example, between an inverter device for controlling a motor and an AC power supply. Upon deceleration of the motor, electric power is supplied from the motor to the power regenerative converter through the inverter device. The power regenerative converter converts the power into AC power by a power conversion unit, and supplies the AC power to the AC power supply.

Power regeneration by the power regenerative converter is performed in phase synchronization with the AC power supply. In other words, the power regenerative converter detects an AC voltage supplied from the AC power supply, and detects the phase of the AC power supply based on the detection result. The power regenerative converter controls the power conversion unit in accordance with the detected phase of the AC power supply to cause regenerative electric power (see, for example, JP-A-2011-101473).

SUMMARY

A power regeneration apparatus according to an aspect of embodiments includes a power conversion unit, an AC reactor, a voltage detecting unit, a phase detecting unit, a drive control unit for controlling the power conversion unit based on a phase detection value detected by the phase detecting unit, and a reactive current component detecting unit. The power conversion unit is connected to an AC power supply and has a function of converting DC power into AC power and regenerating the AC power to the AC power supply. The AC reactor is connected between an AC-side terminal of the power conversion unit and the AC power supply. The voltage detecting unit detects an AC voltage supplied from the AC power supply, and outputs an AC detection signal in accordance with the AC voltage. The phase detecting unit detects the phase of the AC power supply based on the AC detection signal. The reactive current component detecting unit detects a reactive current component of a current flowing through the AC-side terminal of the power conversion unit. The drive control unit includes a phase correction section. The phase correction section corrects the phase detection value detected by the phase detecting unit based on the reactive current component.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A detailed description will hereinafter be given of embodiments of a power regeneration apparatus and a power conversion apparatus, which are disclosed in the present application, with reference to the drawings. The present disclosure is not limited to the embodiments indicated below.

Figure 1:
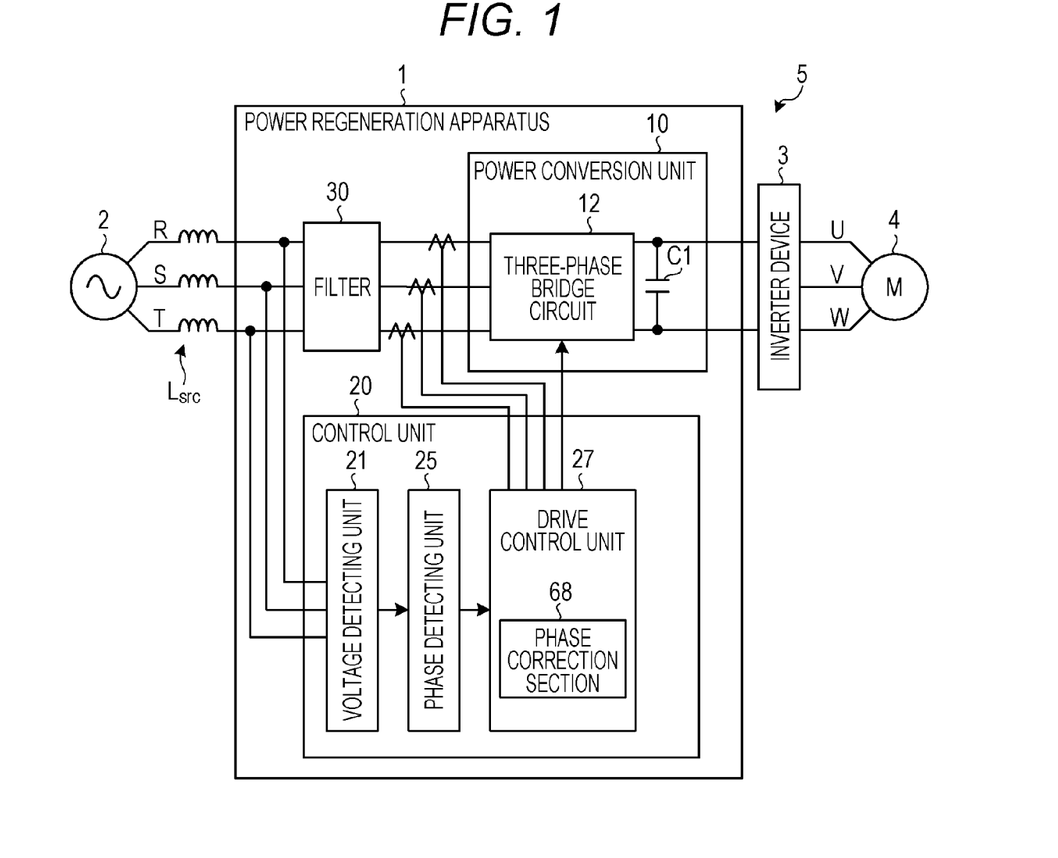
FIG. 1 is an explanatory diagram illustrating the configurations of a power regeneration apparatus and a power conversion apparatus according to embodiments.

A description will be given of a power regeneration apparatus 1 according to the embodiments, and a power conversion apparatus 5 including the power regeneration apparatus 1 with reference to FIG. 1. FIG. 1 is an explanatory diagram illustrating the configurations of the power regeneration apparatus 1 and the power conversion apparatus 5. The power regeneration apparatus 1 corresponds to an example of a power regenerative converter.

As illustrated in FIG. 1, the power conversion apparatus 5 includes the power regeneration apparatus 1 and an inverter device 3. The operation state of the power regeneration apparatus 1 is switched between a motoring operation state and a regenerative operation state. In the motoring operation state, electric power to drive a motor 4 is supplied to the inverter device 3. In the regenerative operation state, electric power supplied from the inverter device 3 is regenerated to a three-phase AC power supply 2. The power conversion apparatus 5 performs cooperative control on the power regeneration apparatus 1 and the inverter device 3.

For example, the power conversion apparatus 5 is spaced a relatively long distance (e.g., several Km) apart from the three-phase AC power supply 2. Reactance component $L_{src}$ of the wiring path, which reaches a predetermined amount, exists between the power conversion apparatus 5 and the three-phase AC power supply 2.

Upon motoring operation, the power regeneration apparatus 1 functions as a converter device, and converts AC power supplied from the three-phase AC power supply 2 into DC power. The inverter device 3 converts the DC power converted by the power regeneration apparatus 1 into AC power. The inverter device 3 drives the motor 4 by the AC power.

On the other hand, upon regenerative operation, the inverter device 3 drives switching elements therein to convert an induced electromotive force created at the motor 4 by the deceleration of the motor 4 into DC power. The inverter device 3 supplies the DC power to the power regeneration apparatus 1. The power regeneration apparatus 1 converts the DC power supplied from the inverter device 3 into AC power, and supplies the AC power to the three-phase AC power supply 2. Consequently, power regeneration is realized.

The power regeneration apparatus 1 includes a power conversion unit 10, a control unit 20, and a current smoothing filter 30. The power conversion unit 10 is arranged between the three-phase AC power supply 2 and the inverter device 3. The control unit 20 controls the power conversion unit 10. The filter 30 is arranged between each phase of the three-phase AC power supply 2 and the power conversion unit 10.

Figure 2:
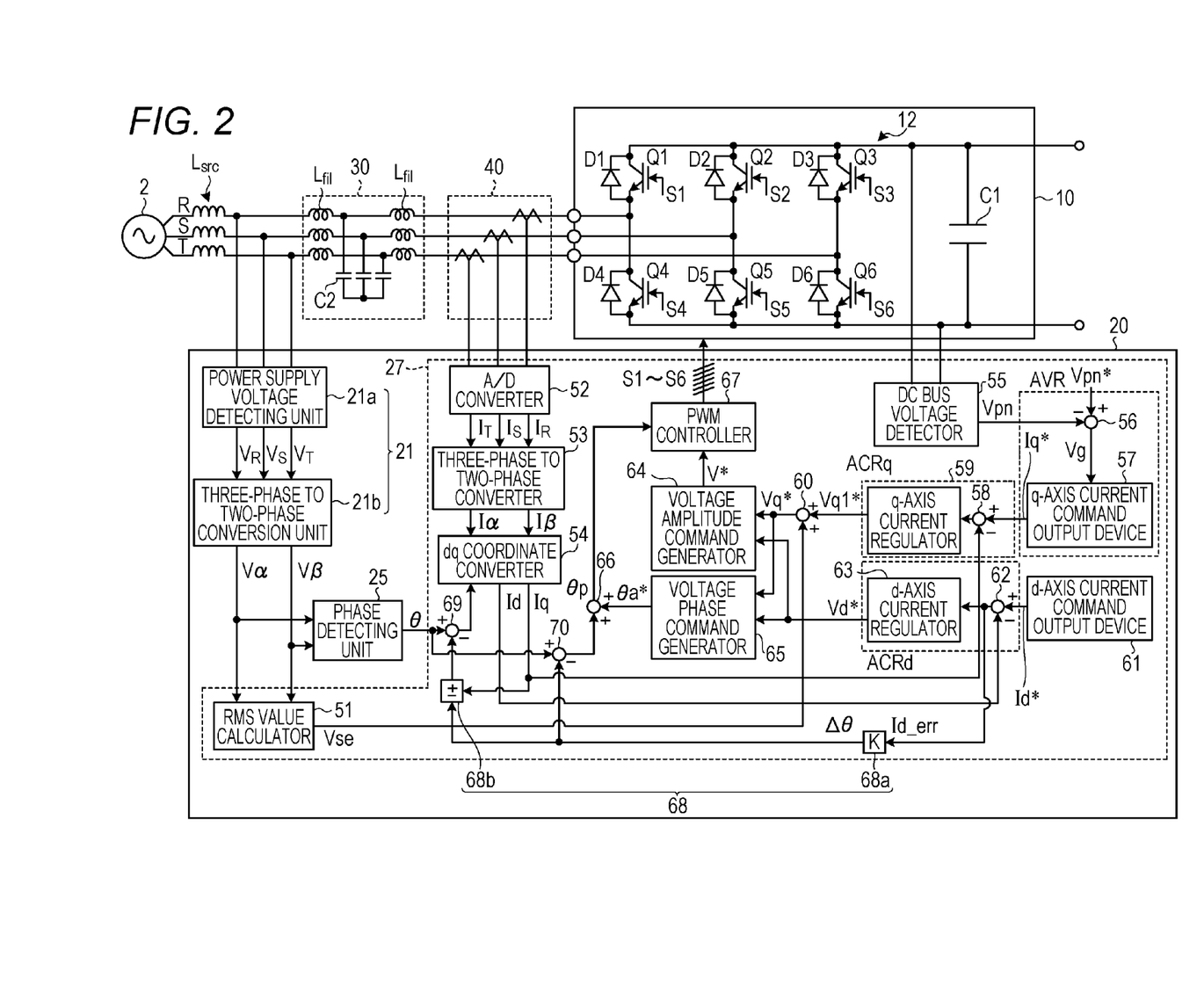
FIG. 2 is an explanatory diagram illustrating an example of the specific configuration of a power regeneration apparatus according to a first embodiment.

The power conversion unit 10 includes a three-phase bridge circuit 12 and a smoothing capacitor C1. As illustrated in FIG. 2, which is described in detail below, the three-phase bridge circuit 12 includes, for example, six diodes D1 to D6. The diodes D1 to D6 are connected in a three-phase bridge configuration. Switching elements Q1 to Q6 are respectively connected in anti-parallel with the diodes D1 to D6.

The three-phase bridge circuit 12 rectifies an AC voltage supplied from the three-phase AC power supply 2 upon motoring operation. The voltage rectified by the three-phase bridge circuit 12 is smoothed by the smoothing capacitor C1. As a result, DC power is accumulated in the smoothing capacitor C1, and the DC power is supplied to the inverter device 3.

Moreover, upon regenerative operation, the three-phase bridge circuit 12 supplies to the three-phase AC power supply 2 power supplied from the motor 4 via the inverter device 3. In other words, the three-phase bridge circuit 12 regenerates power. In other words, the three-phase bridge circuit 12 can convert the DC power supplied from the inverter device 3 and accumulated in the smoothing capacitor C1 into AC power, and supply the AC power to the three-phase AC power supply 2.

The three-phase bridge circuit 12 is controlled by the control unit 20. As illustrated in FIG. 1, the control unit 20 includes a voltage detecting unit 21, a phase detecting unit 25, and a drive control unit 27.

The voltage detecting unit 21 continues to repeat the detection of an instantaneous value of an AC voltage output from the three-phase AC power supply 2. Furthermore, the voltage detecting unit 21 outputs a detection signal in accordance with the detection result (hereinafter described as the "AC detection signal") to the phase detecting unit 25. The waveform of the AC detection signal corresponds to the voltage waveform of the three-phase AC power supply 2.

The phase detecting unit 25 detects the phase of the three-phase AC power supply 2 based on the AC detection signal output from the voltage detecting unit 21.

The drive control unit 27 drives the switching elements Q1 to Q6 (see FIG. 2) in the three-phase bridge circuit 12 in accordance with the operation state, based on the phase of the three-phase AC power supply 2, which has been detected by the phase detecting unit 25. Consequently, the drive control unit 27 converts power in accordance with the operation state.

Moreover, as illustrated in FIG. 1, the drive control unit 27 includes a phase correction section 68. For example, if the distance of the path linking the three-phase AC power supply 2 and the power regeneration apparatus 1 is relatively long, the reactance component $L_{src}$ increases. Hence, undesired low frequency disturbance may occur upon power regeneration (see FIG. 3).

The phase correction section 68 suppresses the occurrence of such low-frequency disturbance. As described above, a phase shift (phase detection error) may occur in a voltage phase detection value θ detected by the phase detecting unit 25 due to the low-frequency disturbance arising from the reactance component $L_{src}$ of the long-distance wiring. In this case, the phase correction section 68 corrects the shift.

The function of the phase correction section 68 makes it possible to suppress low-frequency disturbance easily, for example, without inserting a damping resistor between the three-phase AC power supply 2 and the power regeneration apparatus 1, or adjusting the gain of a current regulator. The phase correction section 68 is a main part of the power regeneration apparatus 1 and the power conversion apparatus 5, and is described in detail below.

First Embodiment

A description will be given of an example of a specific configuration of the power regeneration apparatus 1 according to a first embodiment with reference to FIG. 2.

As illustrated in FIG. 2, the filter 30 and a current detecting unit 40 are provided between the three-phase AC power supply 2 and the power conversion unit 10. The filter 30 includes six AC reactors $L_{fil}$ and three capacitors C2. Each two of the AC reactors $L_{fil}$ are connected in series between each phase of the three-phase AC power supply 2 and the power conversion unit 10. The capacitor C2 is connected between a midpoint of the two AC reactors $L_{fil}$ connected in series and an imaginary neutral point. Moreover, the current detecting unit 40 detects current values $I_R$, $I_S$, and $I_T$ of the phases. The configuration of the filter 30 is not limited to the one illustrated in FIG. 2.

The control unit 20 of the power regeneration apparatus 1, as illustrated in FIG. 2, includes a power supply voltage detecting unit 21a, a three-phase to two-phase conversion unit 21b, the phase detecting unit 25, and the drive control unit 27. The power supply voltage detecting unit 21a and the three-phase to two-phase conversion unit 21b correspond to an example of the voltage detecting unit 21 (see FIG. 1).

The power supply voltage detecting unit 21a detects the voltage of the three-phase AC power supply 2. Specifically, the power supply voltage detecting unit 21a detects instantaneous values of the R-, S-, and T-phase voltages of the three-phase AC power supply 2 in the vicinity of the filter 30. The power supply voltage detecting unit 21 detects, for example, an AC voltage at a terminal on the three-phase AC power supply 2 of the filter 30. The voltage detecting unit 21a outputs the AC detection signals $V_R$, $V_S$, and $V_T$ in accordance with the detection results.

The three-phase to two-phase conversion unit 21b converts the AC detection signals $V_R$, $V_S$, and $V_T$ into biaxial components (α and β components) that are orthogonal on a fixed coordinate. Consequently, the three-phase to two-phase conversion unit 21b obtains a fixed coordinate voltage vector of the α-β axis coordinate system of the AC detection signals $V_R$, $V_S$, and $V_T$. The components of the voltage vector are an AC detection signal Vα in the α axis direction, and an AC detection signal Vβ in the β axis direction. The three-phase to two-phase conversion unit 21b outputs the AC detection signals Vα and Vβ to the phase detecting unit 25.

The phase detecting unit 25 detects the voltage phase of the three-phase AC power supply 2 based on the AC detection signals Vα and Vβ output from the three-phase to two-phase conversion unit 21b. The phase detecting unit 25 outputs the detection result as the voltage phase detection value θ. For example, the phase detecting unit 25 converts the AC detection signals Vα and Vβ into dq components of an orthogonal coordinate system that includes d and q axes. In this case, the phase detecting unit 25 calculates the voltage phase of the three-phase AC power supply 2 such that the d-axis component (d component) is zero. The phase detecting unit 25 outputs the voltage phase detection value θ in accordance with the voltage phase of the three-phase AC power supply 2, which has been calculated in this manner.

The configurations of the voltage detecting unit 21 and the phase detecting unit 25 are not limited to those in FIG. 2. For example, the voltage detecting unit 21 may detect an AC voltage at the midpoint of the two AC reactors $L_{fil}$ in accordance with each phase (the connection point of the two AC reactors $L_{fil}$ connected in series), or an AC-side terminal of the power conversion unit 10. In this case, the voltage detecting unit 21 or the phase detecting unit 25 may add to the detected AC voltage, the multiplied value of the current flowing through the AC-side terminal and the impedance of the above two AC reactors. Consequently, the AC voltage of the three-phase AC power supply is obtained. The phase detecting unit 25 may estimate a phase based on the AC voltage.

The drive control unit 27 includes an RMS value calculator 51, an A/D converter 52, a three-phase to two-phase converter 53, a dq coordinate converter 54, a DC bus voltage detector 55, and a subtractor 56. The three-phase to two-phase converter 53 and the dq coordinate converter 54 correspond to an example of a coordinate conversion unit.

Moreover, the drive control unit 27 includes a q-axis current command output device 57, a q-axis current deviation calculator 58, a q-axis current regulator 59, a q-axis voltage command corrector 60, a d-axis current command output device 61, a d-axis current deviation calculator 62, and a d-axis current regulator 63. Moreover, the drive control unit 27 includes a voltage amplitude command generator 64, a voltage phase command generator 65, an adder 66, and a PWM controller 67 as a control signal generation unit. Furthermore, the drive control unit 27 includes a phase converter 68a and a sign switching unit 68b, which constitute the phase correction section 68.

The RMS value calculator 51 detects an RMS voltage value Vse of the three-phase AC power supply 2 based on the AC detection signals Vα and Vβ output from the three-phase to two-phase conversion unit 21b.

The A/D converter 52 converts, into digital values, phase current detection values $I_R$, $I_S$, and $I_T$ detected by the current detecting unit 40 by A/D conversion. The phase current detection value $I_R$ is an instantaneous value of the R-phase current. The phase current detection value $I_S$ is an instantaneous value of the S-phase current. The phase current detection value $I_T$ is an instantaneous value of the T-phase current. The current detecting unit 40 may be, for example, a current sensor that detects current using a Hall element being a magneto-electric transducer.

The three-phase to two-phase converter 53 converts the phase current detection values $I_R$, $I_S$, and $I_T$ into components (α and β components) of two axes that are orthogonal on a fixed coordinate. Consequently, the three-phase to two-phase converter 53 obtains a fixed coordinate current vector of the αβ axis coordinate system of the phase current detection values $I_R$, $I_S$, and $I_T$. The components of the current vector are a current value Iα in the α axis direction, and a current value Iβ in the β axis direction.

The dq coordinate converter 54 converts the current values Iα and Iβ output from the three-phase to two-phase converter 53 based on the voltage phase detection value θ detected by the phase detecting unit 25. With the conversion, the dq coordinate converter 54 obtains a q-axis component and a d-axis component of the d-q axes rotating coordinate system. In other words, the dq coordinate converter 54 obtains a q-axis current value Iq and a d-axis current value Id (=a reactive current component). In this manner, the dq coordinate converter 54 functions as a reactive current component detecting unit.

The DC bus voltage detector 55 detects a DC voltage on the inverter device 3 (see FIG. 1) side of the power conversion unit 10. Specifically, the DC bus voltage detector 55 detects an inter-terminal voltage value of the smoothing capacitor C1 as a DC voltage value Vpn, and outputs it to the subtractor 56.

The subtractor 56 subtracts the DC voltage value Vpn output from the DC bus voltage detector 55 from a voltage command Vpn* to obtain a differential voltage value Vg. The subtractor 56 outputs the differential voltage value Vg to the q-axis current command output device 57.

The q-axis current command output device 57 generates a q-axis current command Iq* based on the differential voltage value Vg output from the subtractor 56, and outputs it to the q-axis current deviation calculator 58. The q-axis current command Iq* is a target current value of an active current. The subtractor 56 and the q-axis current command output device 57 configure an AVR (automatic voltage regulator).

The q-axis current deviation calculator 58 calculates a q-axis current deviation being a deviation between the q-axis current command Iq* and the q-axis current value Iq output from the dq coordinate converter 54, and outputs it to the q-axis current regulator 59.

The q-axis current regulator 59 regulates a q-axis voltage command Vq1* such that the deviation between the q-axis current command Iq* and the q-axis current value Iq is zero, and outputs it to the q-axis voltage command correction device 60. The q-axis current deviation calculator 58 and the q-axis current regulator 59 configure an ACRq (q-axis current controller).

The q-axis voltage command corrector 60 adds the q-axis voltage command Vq1* output from the q-axis current regulator 59 and the RMS voltage value Vse output from the RMS value calculator 51 to obtain a q-axis voltage command Vq*. The q-axis voltage command corrector 60 outputs the q-axis voltage command Vq* to the voltage amplitude command generator 64 and the voltage phase command generator 65.

The d-axis current command output device 61 generates a d-axis current command Id*, and outputs it to the d-axis current deviation calculator 62. The d-axis current command Id* is a target current value of a reactive current. For example, if the power factor is set to 1, the d-axis current command Id* is set to zero.

The d-axis current deviation calculator 62 calculates a d-axis current deviation being a deviation between the d-axis current command Id* and the d-axis current value Id, and outputs it to the d-axis current regulator 63. The d-axis current regulator 63 adjusts the d-axis voltage command Vd* such that the deviation between the d-axis current command Id* and the d-axis current value Id is zero, and outputs it to the voltage amplitude command generator 64 and the voltage phase command generator 65. The d-axis current deviation calculator 62 and the d-axis current regulator 63 configure an ACRd (d-axis current regulator).

The voltage amplitude command generator 64 obtains an output voltage command V* based on the q-axis voltage command Vq* output from the q-axis voltage command corrector 60 and the d-axis voltage command Vd* output from the d-axis current regulator 63. For example, the voltage amplitude command generator 64 obtains the output voltage command V* from the following equation (1).

$$\text{Output voltage command } V^* = (Vd^{*2} + Vq^{*2})^{1/2} \quad (1)$$

The voltage phase command generator 65 obtains an output phase command θa* based on the q-axis voltage command Vq* output from the q-axis voltage command corrector 60 and the d-axis voltage command Vd* output from the d-axis current regulator 63. For example, the voltage phase command generator 65 obtains the output phase command θa* from the following equation (2).

$$\text{Output phase command } \theta a^* = \tan^{-1}(Vq^*/Vd^*) \quad (2)$$

A second calculator 70 subtracts a phase correction value Δθ output from the phase converter 68a, from the voltage phase detection value θ output from the phase detecting unit 25. The adder 66 adds the subtraction result (subtracted value) output from the second calculator 70 to the output phase command θa* output from the voltage phase command generator 65 to calculate a phase θp.

The PWM controller 67 being a control signal generation unit obtains a three-phase AC voltage command based on the output voltage command V* output from the voltage amplitude command generator 64 and the phase θp calculated by the adder 66. The three-phase AC voltage command is an output voltage command $V_R^*$, $V_S^*$, or $V_T^*$ for each phase of the three-phase AC power supply 2. For example, the PWM controller 67 obtains the R-phase output voltage command $V_R^*$, the S-phase output voltage command $V_S^*$, and the T-phase output voltage command $V_T^*$ from the following equations (3) to (5).

$$V_R^* = V^* \times \sin(\theta p) \quad (3)$$

$$V_S^* = V^* \times \sin(\theta p - (2\pi/3)) \quad (4)$$

$$V_T^* = V^* \times \sin(\theta p + (2\pi/3)) \quad (5)$$

The PWM controller 67 then generates PWM signals S1 to S6 based on the output voltage commands $V_R^*$, $V_S^*$, and $V_T^*$. The PWM signals S1 to S6 are respectively signals for controlling the switching elements Q1 to Q6 of the power conversion unit 10. Consequently, three-phase AC voltages are output from an AC-side output terminal of the power conversion unit 10 in accordance with the output voltage commands $V_R^*$, $V_S^*$, and $V_T^*$. The switching elements Q1 to Q6 include self-turn-off semiconductor elements such as IGBT and MOSFET.

Next, a description will be given of the phase correction section 68. The phase correction section 68 suppresses the occurrence of low-frequency disturbance in the power regeneration apparatus 1. As described above, a phase shift (a shift between a true phase value and a detection value) may occur in the voltage phase detection value θ detected by the phase detecting unit 25, due to the reactance component $L_{src}$ of the wiring. In this case, the phase correction section 68 corrects the shift. Consequently, the phase correction section 68 can suppress the occurrence of low-frequency disturbance.

Figure 3:
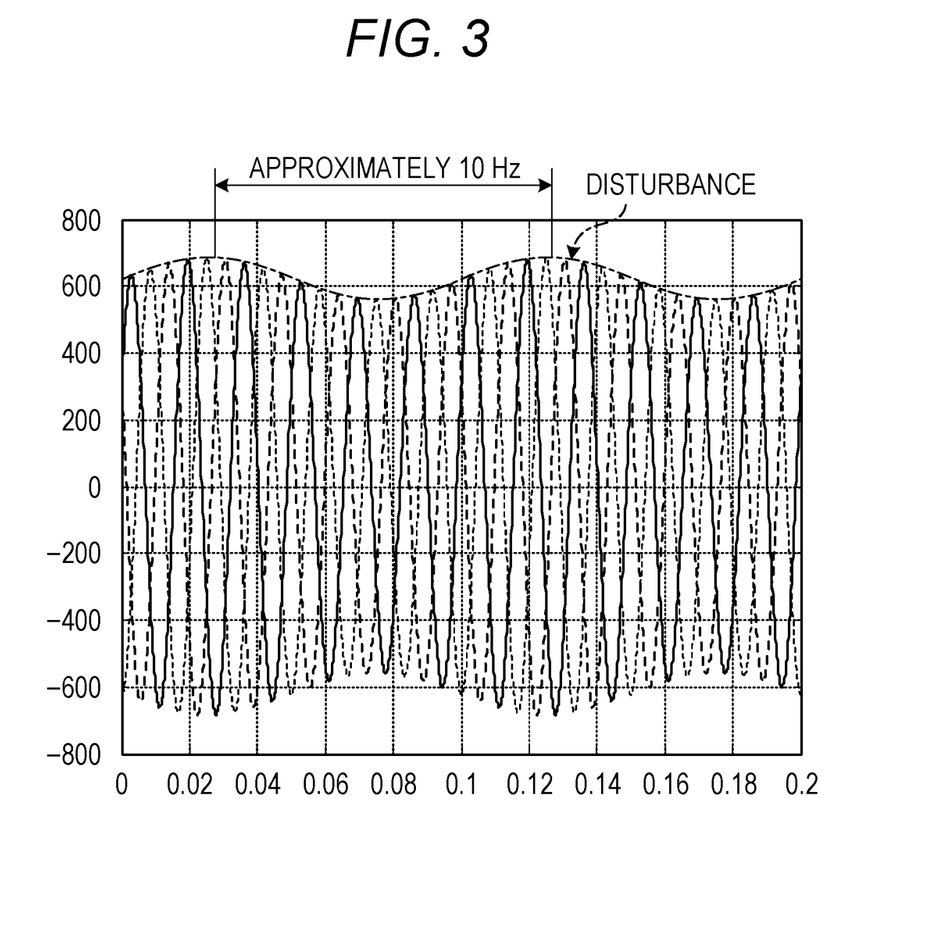
FIG. 3 is an explanatory diagram illustrating a disturbance phenomenon of a power supply voltage.

Before a description is given of the phase detecting unit 25, a phenomenon where a power supply voltage Vs is disturbed at a low frequency in long distance wiring (see FIG. 3) is considered. FIG. 3 is an explanatory diagram illustrating a disturbance phenomenon of the power supply voltage. In an example illustrated in the drawing, the rated frequency is 60 Hz, AC is 440 V.

Causes of the occurrence of low-frequency disturbance are considered based on a cycle described below:
(1) A power supply current is disturbed by an external factor.
(2) The disturbed power supply current flows in the reactance component $L_{src}$ between the three-phase AC power supply 2 and the power regeneration apparatus 2. Consequently, the disturbed counter electromotive force occurs.
(3) The voltage detecting unit 21 detects the disturbed counter electromotive force. As a result, a shift in a phase detected by the phase detecting unit 25 occurs.
(4) Current control by the current controller (ACR) becomes difficult due to the shift.
(5) Furthermore, since the reactance component $L_{src}$ is large, the responsiveness of a current loop including the current controller (ACR) becomes slower than a design value.
(6) As a result, the current controller (ACR) outputs a disturbed voltage command. Consequently, a disturbed current flows.
(7) The above (1) to (6) events are repeated, and disturbance occurs.

Next, a more specific description will be given of the cause of the generation of a disturbance phenomenon using the drawings and equations. It is considered that the major causes out of the disturbance causes are the following two points.

(A) One cause is related to the above (5), and especially is the deterioration of a current control response due to an increase in the reactance component $L_{src}$ of a power supply path.

(B) Moreover, the other cause is disturbance that occurs in the estimation of power supply phase detection.

A description will be given of (A). If the reactance component $L_{src}$ of the power supply path increases, a response of the current loop including the ACR becomes slower than the design value. The control response angular frequency (w) of the current loop is generally expressed in the following equation (6). From the equation (6), if "L→large," it is found that "ω→small."

$L_{fil}$: the reactance component of the LCL filter 30
$L_{src}$: the reactance component of the wiring If the response of the current loop becomes slower, the AVR (the subtractor 56 and the q-axis current command output device 57) cannot also control a bus voltage normally. Hence, the q-axis current command Iq* being an output of the AVR is disturbed.

If the responsiveness of the current loop decreases due to the unexpected reactance component $L_{src}$ of the wiring, there is a case where the time constant of the AVR approaches the response (time constant) of the current loop. In this case, the q-axis current command Iq* becomes easy to oscillate.

Figure 4:
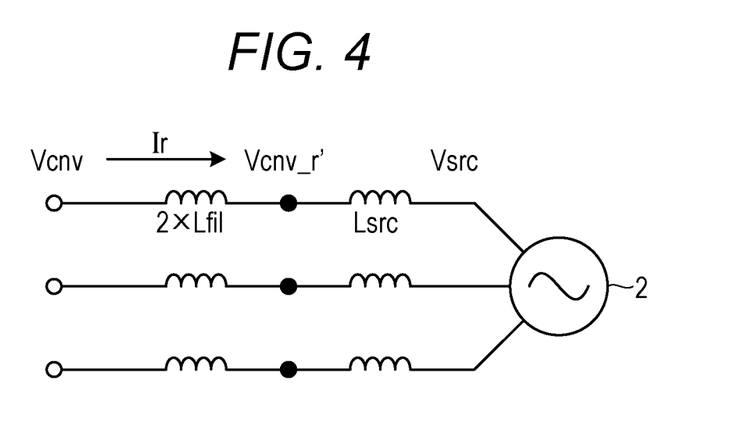
FIG. 4 is an explanatory diagram illustrating a circuit including a filter and the reactance component of a wiring path.

FIG. 4 is an explanatory diagram illustrating a circuit including the filter 30 and the reactance component $L_{src}$ of the wiring. For convenience's sake, an influence by the capacitor is ignored (to target only a low-frequency disturbance component). In the power regeneration apparatus 1, as illustrated, a three-phase AC voltage ($V_{cnv\_r}'$) in the vicinity of the filter 30 is detected to detect a power supply phase. Moreover, an equation is created from a supply voltage ($V_{src}=V_s$) from the three-phase AC power supply, the reactance component $L_{src}$ of the wiring and the AC reactors $L_{fil}$ of the filter 30 (however, all the impedances of the six AC reactors are made equal), the AC-side terminal voltage ($V_{cnv}=V_{d\_cnv}+V_{q\_cnv}$) of the power conversion unit 10, and a current. A d-q conversion is performed on the equation to obtain the following equation (8). In the equation (8), an axis being in phase with the three-phase AC power supply is set to be a q axis. An axis lagging the q axis by 90 degrees in phase is set to be a d axis. The positive side of voltage and current is the three-phase AC power supply side.

$$\frac{1}{sL+R}\left\{\begin{bmatrix} 0 \\ V_s \end{bmatrix} - \begin{bmatrix} V_{d\_cnv} \\ V_{q\_cnv} \end{bmatrix} - \begin{bmatrix} 0 & -\omega L \\ \omega L & 0 \end{bmatrix}\begin{bmatrix} I_d \\ I_q \end{bmatrix}\right\} = \begin{bmatrix} I_d \\ I_q \end{bmatrix} \quad (8)$$

$V_{d\_cnv}$ and $V_{q\_cnv}$ are a d-axis component and a q-axis component of an AC-side terminal voltage of the power conversion unit 10. Id and Iq are a d-axis component and a q-axis component of a current flowing through the AC-side terminal of the power conversion unit 10. Moreover, it is assumed that L (inductance value)=$L_{src}$+2·$L_{fil}$.

Figure 5:
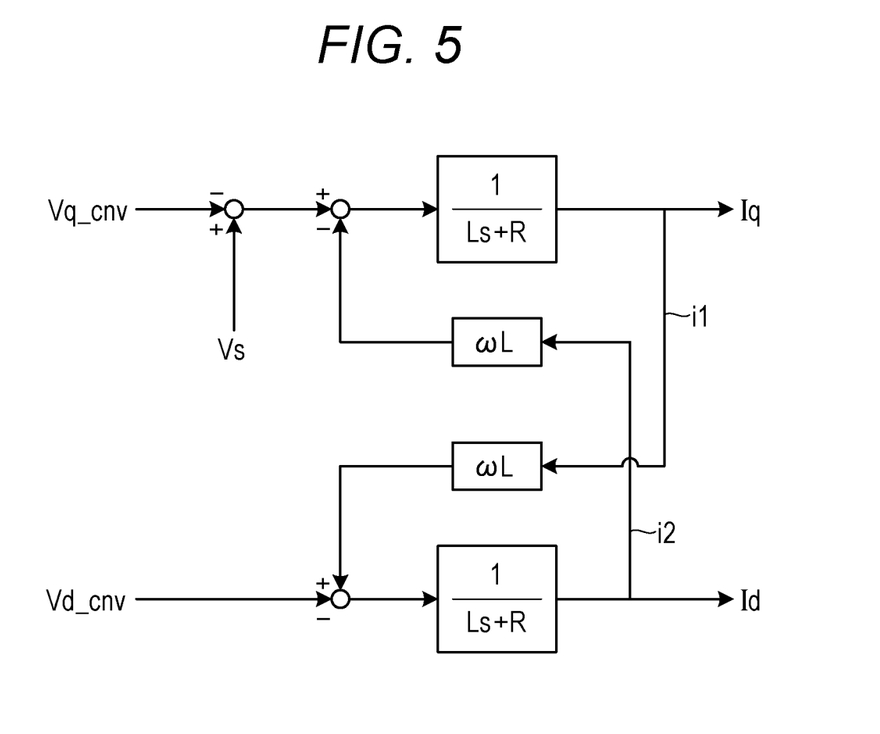
FIG. 5 is an explanatory diagram illustrating an interference term.

FIG. 5 is a block diagram created based on the equation (8). FIG. 5 is an explanatory diagram illustrating an interference term.

As illustrated in FIG. 5, if the q-axis current Iq is disturbed, the interference term due to the q-axis current Iq interferes with the d-axis current side of the power regeneration apparatus 1 as indicated by a symbol i1. On the other hand, if the d-axis current Id is disturbed, the interference term due to the d-axis current Id interferes with the q-axis current side of the power regeneration apparatus 1 as indicated by a symbol i2. In other words, as illustrated in FIG. 5, a multiplied value of the q-axis current Iq and a disturbance component ω*L is superimposed on $V_{d\_cnv}$ by the interference term. Similarly, a multiplied value of the d-axis current Id and the disturbance component ω*L is superimposed on the differential value between Vs and $V_{q\_cnv}$ by the interference term. As a result, the power supply voltage is disturbed.

Figure 6:
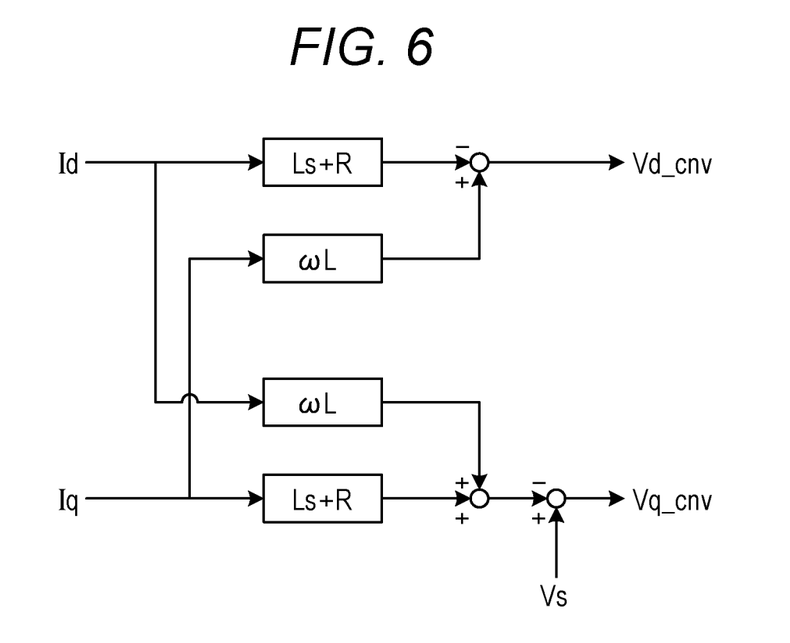
FIG. 6 is an explanatory view illustrating a relationship between input/output currents and voltages on an AC-terminal side of a power conversion unit of the power regeneration apparatus.

In order to clarify the voltage relationship, the equation (8) is transposed to obtain an equation (9). FIG. 6 is a block diagram created based on the equation (9). FIG. 6 is an explanatory diagram illustrating a relationship between currents and voltages on the power regeneration apparatus 1 side of the system.

$$\begin{bmatrix} V_{d\_cnv} \\ V_{q\_cnv} \end{bmatrix} = \left\{\begin{bmatrix} sL+R & 0 \\ 0 & sL+R \end{bmatrix} + \begin{bmatrix} 0 & -\omega L \\ \omega L & 0 \end{bmatrix}\right\}\begin{bmatrix} I_d \\ I_q \end{bmatrix} + \begin{bmatrix} 0 \\ V_s \end{bmatrix} \quad (9)$$

The frequency of disturbance is low. Focusing on this point, a differential operator "s" is approximated to zero. Moreover, if inter-wire resistance "R" is also sufficiently small, FIG. 6 is rewritten as in FIG. 7.

Figure 7:
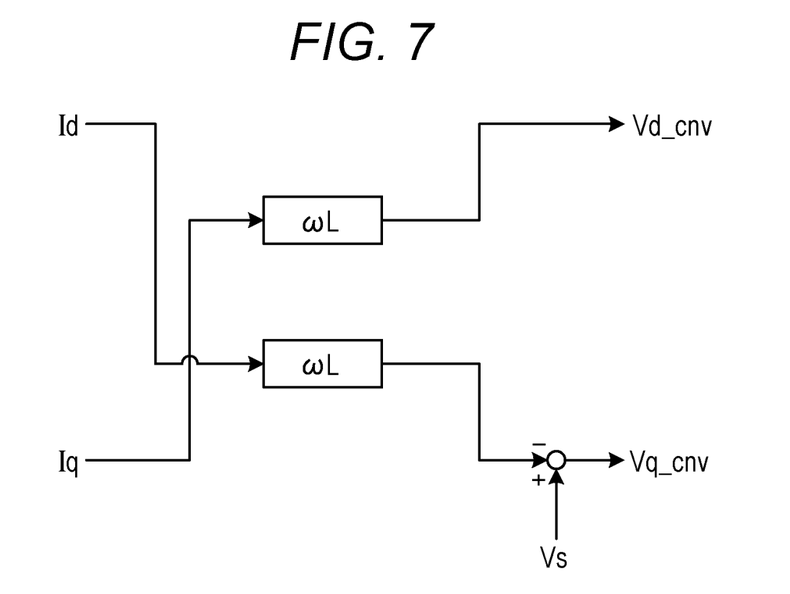
FIG. 7 is an explanatory diagram illustrating the modified relationship between the input/output currents and the voltages on the AC-terminal side of the power conversion unit of the power regeneration apparatus.

In other words, as described above, the disturbance of the q-axis current value Iq causes the disturbance of the d-axis current value Id. As illustrated in FIG. 7, the reactance component $L_{src}$ of the wiring influences the voltages (Vd_cnv and Vq_cnv) on the AC terminal side of the power conversion unit 10 and becomes a cause of disturbance.

Figure 8:
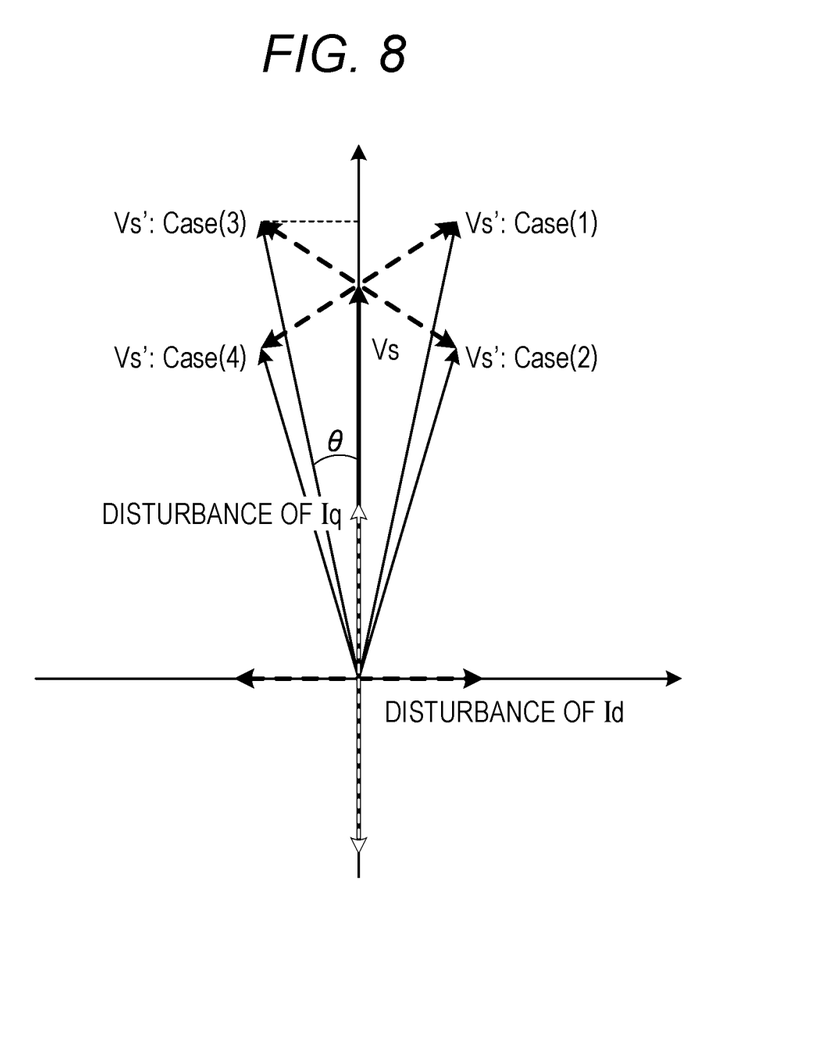
FIG. 8 is an explanatory diagram illustrating a relationship between current disturbance and voltage disturbance.

FIG. 8 is an explanatory diagram illustrating a relationship between current disturbance and voltage disturbance. Usually, in the voltage detection with the three-phase AC power supply, a three-phase AC voltage in the vicinity of the filter 30 is detected. Hence, the voltage detecting unit 21 detects a value different from an actual three-phase power supply voltage. If voltage disturbance occurs, the voltage detecting unit 21 detects voltages indicated in Cases (1) to (4).

Cases (1) to (4) illustrated in FIG. 8 are in the following states:

Case (1): Id<0, Iq>0
Case (2): Id>0, Iq>0
Case (3): Id<0, Iq<0
Case (4): Id>0, Iq<0

In Case (1), with respect to the d axis, a positive interference voltage, (Iq×ωL), occurs. With respect to the q axis, a positive interference voltage, (−Id×ωL), is superimposed on Vs. In Case (2), with respect to the d axis, the positive interference voltage, (Iq×ωL), occurs. With respect to the q axis, a negative interference voltage, (−Id×ωL), is superimposed on Vs. In Case (3), with respect to the d axis, a negative interference voltage, (Iq×ωL), occurs. With respect to the q axis, a negative interference voltage, (−Id×ωL), is superimposed on Vs. In Case (3), with respect to the d axis, the negative interference voltage, (Iq×ωL), occurs. With respect to the q axis, the positive interference voltage, (−Id×ωL), is superimposed on Vs. In Case (4), with respect to the d axis, the negative interference voltage, (Iq×ωL), occurs. With respect to the q axis, the negative interference voltage, (−Id×ωL), is superimposed on Vs. FIG. 8 illustrates influences of such interference voltages.

Figure 9:
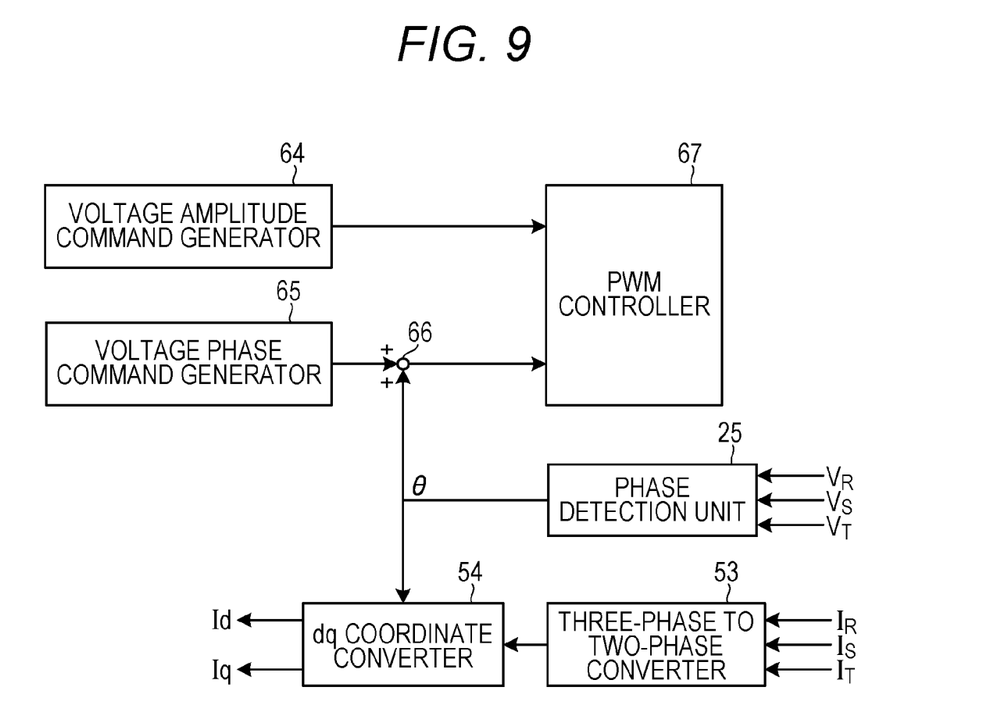
FIG. 9 is an explanatory diagram illustrating an influence that the disturbance gives to phase detection.

Next, a description will be given of (B) being one of the causes of the occurrence of disturbance. (B) is related to disturbance of the estimation of power supply phase detection. FIG. 9 is an explanatory diagram illustrating an influence that the disturbance gives to phase detection. FIG. 9 is a part of the configuration illustrated in FIG. 2 (however, in order to simplify the description, the phase correction section 68 has been removed). As illustrated in FIG. 9, if power supply voltages ($V_R$, $V_S$ and $V_T$) at detection points are disturbed, it leads to the superimposition of a disturbance component also on the result of the phase detection of the power supply voltages. Hence, it becomes difficult to normally calculate the active current component (the q-axis current value Iq) and the reactive current component (=the d-axis current value Id). Furthermore, it also becomes difficult to control current normally. As a result, the disturbance of the power supply voltage strongly occurs.

Considering the above-mentioned causes of disturbance, in the power regeneration apparatus 1 and the power conversion apparatus 5 according to the embodiment, as illustrated in FIG. 2, the drive control unit 27 includes the phase correction section 68 (see FIG. 1) having the phase converter 68a, and the sign switching unit 68b. The phase correction section 68 corrects a phase detection error upon d-q conversion in current detection. Furthermore, the phase correction section 68 corrects also the phase of an AC-side terminal voltage command of the power conversion unit 10.

Specifically, as illustrated in FIG. 2, the phase correction section 68 includes the phase converter 68a, the sign switching unit 68b and a first calculator 69. The phase converter 68a and the sign switching unit 68b are provided between the ACRd including the d-axis current deviation calculator 62 and the d-axis current regulator 63, and a path linking the phase detecting unit 25 and the dq coordinate converter 54. The first calculator 69 is provided on the path linking the phase detecting unit 25 and the dq coordinate converter 54. The first calculator 69 subtracts a sign-processed correction amount Δθ from the phase converter 68a, from the phase value θ detected by the phase detecting unit 25.

Here, the correction amount Δθ is a phase correction amount that is calculated based on a control error of the d-axis current (an output of the d-axis current deviation calculator 62). The correction amount Δθ is, for example, a K-times output of the d-axis current deviation calculator 62. Generally, the d-axis current is controlled to zero. Hence, instead of the d-axis current variation, the detected d-axis current may be directly used.

A phase value output to the dq coordinate converter 54 is a phase value output from the first calculator 69. The phase value is obtained by subtracting the sign-processed correction amount $\Delta\theta$ from the phase converter 68a, from the phase value $\theta$ detected by the phase detecting unit 25.

On the other hand, the adder 66 adds the output phase command $\theta a^*$ from the voltage phase command generator 65 and a value obtained by subtracting the correction amount $\Delta\theta$ (however, a sign process has not been performed thereon) from the phase converter 68a from the phase value $\theta$ detected by the phase detecting unit 25. The addition result is output as the phase $\theta p$ to the PWM controller 67.

The phase value $\theta$ output from the phase detecting unit 25 is simply an estimated phase. The subtraction of the correction amount $\Delta\theta$ obtained by increasing the control error of the d-axis current by gain times, from the phase value $\theta$ makes it possible to stabilize the estimated phase.

Figure 10:
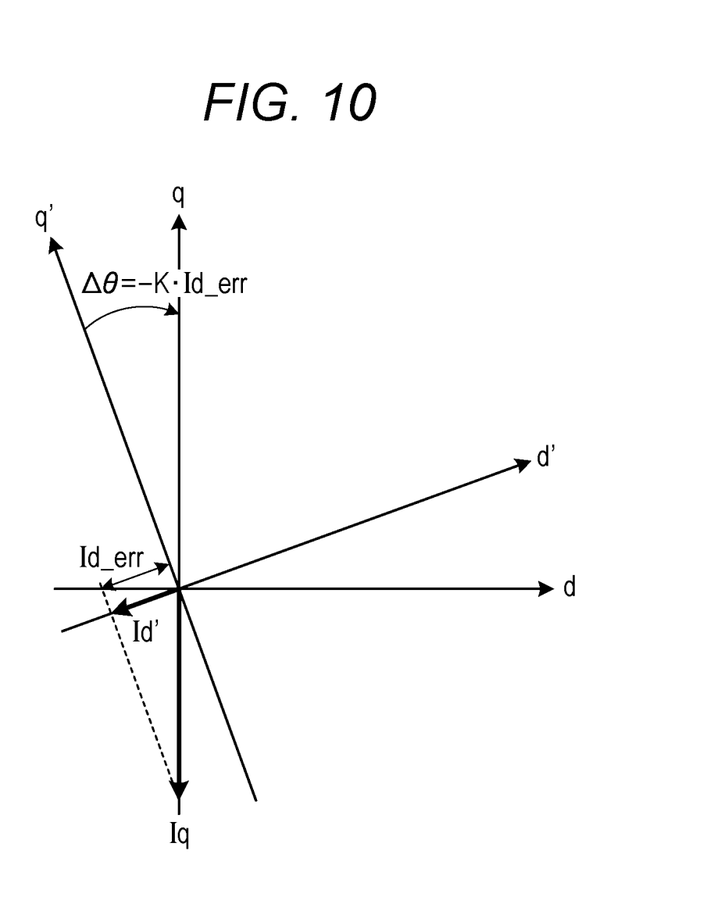
FIG. 10 is a current vector diagram upon regenerative operation.

FIG. 10 illustrates a current vector diagram upon power regeneration (Iq<0). FIG. 10 illustrates a case where the detected phase deviates from an actual power supply phase in the lead direction due to disturbance. In this case, as illustrated in FIG. 10, regardless of the fact that true Id is zero, a part of the q-axis current is detected as Id' (<0) on the d' axis. The d-q axis is an ideal phase of the detected voltage. On the other hand, a d'-q' axis is a phase detected by the power regeneration apparatus 1 (power regenerative converter).

A current command of the d axis is set to "zero", for example. In this case, if a current error Id_err (=−Id'>0) occurs on the d' axis, the phase converter 68a outputs the correction amount $\Delta\theta$ (>0). The first calculator 69 subtracts $\Delta\theta$ from the phase value $\theta$ output from the phase detecting unit 25. As a result, the phase value $\theta$ is corrected in a lag direction. In other words, the phase value $\theta$ is corrected in a direction that eliminates the error.

Figure 11:
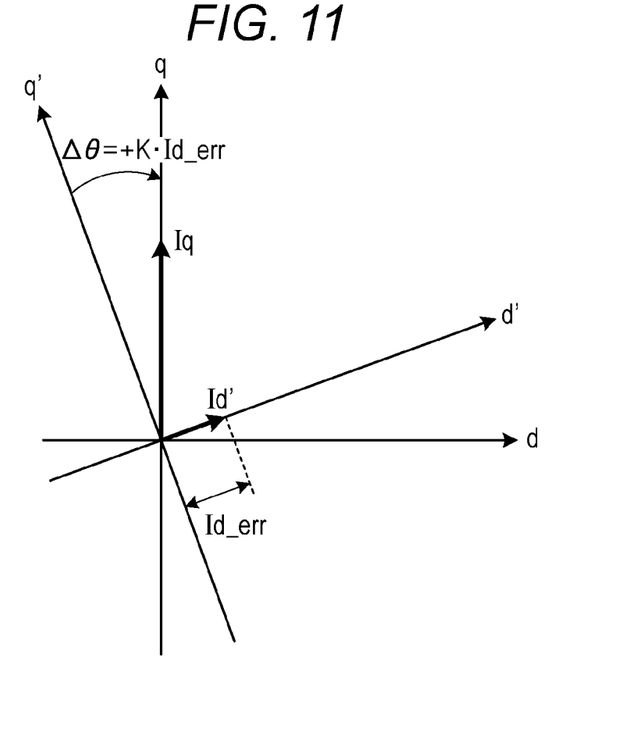
FIG. 11 is a current vector diagram upon motoring operation.

FIG. 11 is a current vector diagram upon motoring operation (Iq>0). In other words, the sign of the q-axis current is negative upon power regeneration. On the other hand, the sign of the q-axis current is positive upon motoring operation (motoring), unlike upon power regeneration. Therefore, even if a direction of axis deviation is the same lead direction, the sign of the current error Id_err (<0) occurring on the d' axis is different.

Hence, the phase value $\theta$ is corrected similarly to upon power regeneration to correct the phase value $\theta$ in a direction that expands the axis deviation (the lead direction). Hence, the phase correction section 68 according to the embodiment includes the sign switching unit 68b. The sign switching unit 68b inverts the sign of $\Delta\theta$ upon motoring operation. Consequently, the correction direction of the correction amount $\Delta\theta$ is switched.

Figure 12:
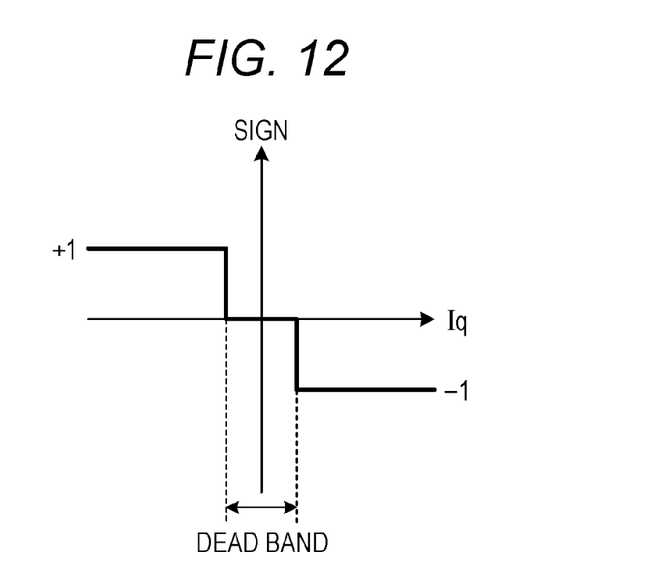
FIG. 12 is an explanatory diagram illustrating a sign process.

Motoring and regeneration may be switched based on the sign of a q-axis current value. In other words, the sign switching unit 68b may set the sign of the correction amount $\Delta\theta$ based on the sign of a q-axis current value. In this case, switching can be executed based on the sign of a q-axis current command value or the sign of a q-axis current detection value. Moreover, if the absolute value of the q-axis current is small, a dead band may be provided as illustrated in FIG. 12 to suppress a switching mistake at a zero cross point. In this case, if the q-axis current is in the dead band, the correction amount AO is set to "zero."

In the second calculator 70, the sign switching process on the output AO of the phase converter 68a is unnecessary. A description will hereinafter be given of a case where a detected phase deviates in the lead direction from an actual power supply phase.

A negative d-axis current is falsely detected upon power regeneration (Iq<0) (see FIG. 10). Hence, the output $\Delta\theta$ of the phase converter 68a is positive. Therefore, a phase $\theta p$ of an AC voltage command lags by $\Delta\theta$ (the AC voltage command rotates and moves clockwise by $\Delta\theta$). As a result, the AC voltage command is output in a direction that suppresses the negative d-axis current. Hence, the occurrence of disturbance is suppressed.

On the other hand, a positive d-axis current is falsely detected upon motoring operation (Iq>0) (see FIG. 11). Hence, the output $\Delta\theta$ of the phase converter 68a is negative. Therefore, the phase Op of an AC voltage command leads by $\Delta\theta$ (the AC voltage command rotates and moves counterclockwise by $\Delta\theta$). As a result, the AC voltage command moves in a direction that suppresses the positive d-axis current. Hence, the occurrence of disturbance is suppressed. Therefore, in any case, the sign switching process on the output $\Delta\theta$ of the phase converter 68a is unnecessary.

Second Embodiment

Next, a description will be given of an example of a specific configuration of the power regeneration apparatus 1 according to a second embodiment with reference to FIGS. 13 and 14.

Figure 13:
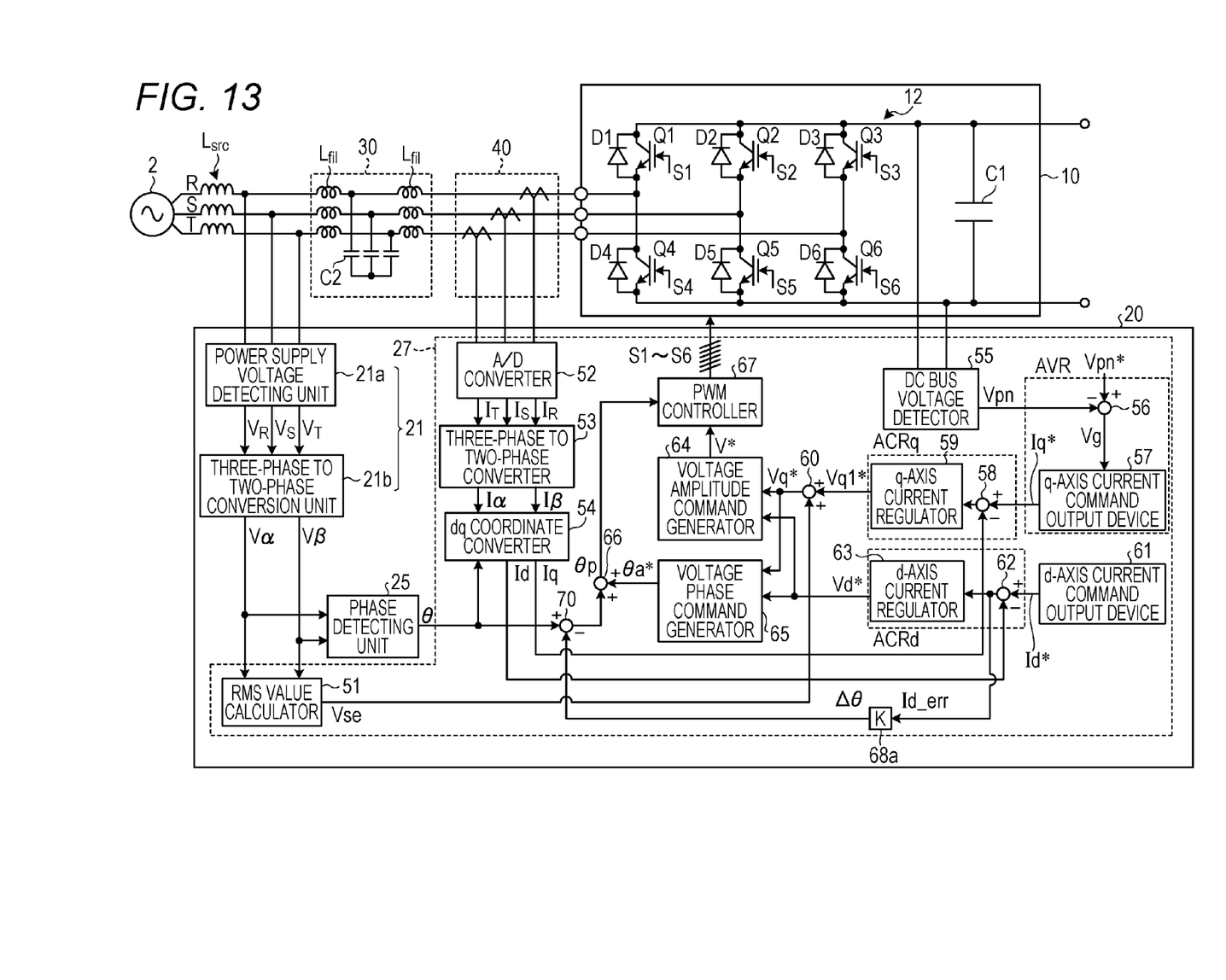
FIG. 13 is an explanatory diagram illustrating an example of the specific configuration of a power regeneration apparatus according to a second embodiment.

FIG. 13 is an explanatory diagram illustrating an example of the specific configuration of the control unit 20 of the power regeneration apparatus 1 according to the second embodiment. FIG. 14 is a current vector diagram upon power regeneration in the second embodiment. A different point between the second embodiment and the first embodiment is the specific configuration of the phase correction section 68. A description will be given below of the different point. Moreover, the same reference numerals are assigned to the same components as those of the first embodiment, and their descriptions will be omitted.

As illustrated in FIG. 13, the control unit 20 of the power regeneration apparatus 1 according to the second embodiment corrects an output voltage phase of an AC-side terminal voltage command of the power conversion unit 10. Consequently, the control unit 20 controls the d-axis current excellently. As a result, the stability of the d-axis current increases.

Specifically, as illustrated, the output $\theta$ of the phase detecting unit 25 is output as it is to the dq coordinate converter 54. The phase correction section 68 corrects an output voltage phase of the AC-side terminal voltage command (e.g., only the output voltage phase).

Figure 14:
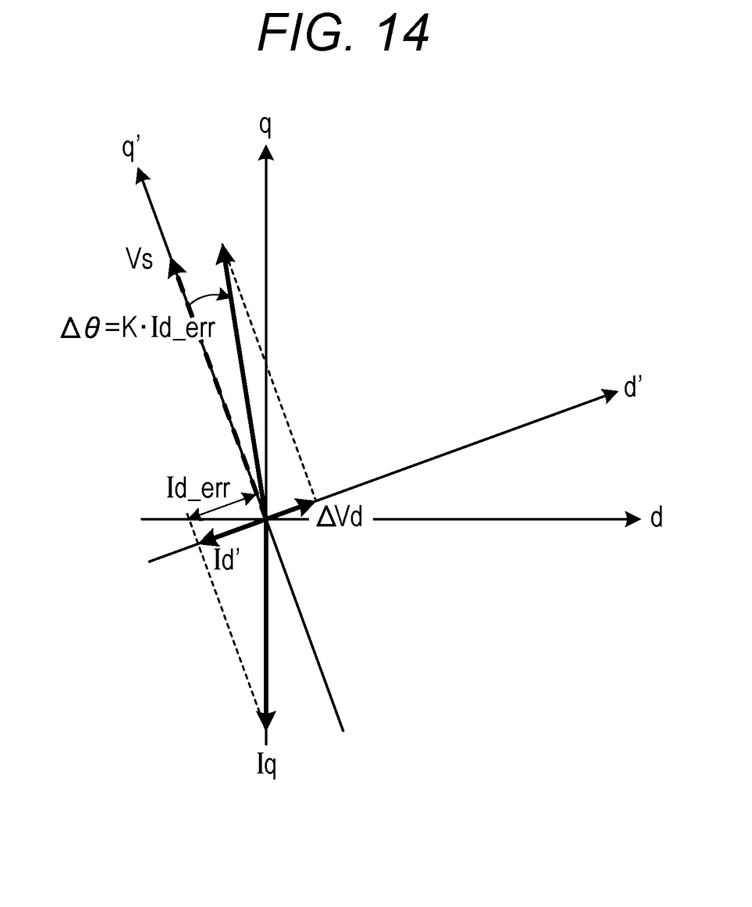
FIG. 14 is a current vector diagram upon power regeneration in the second embodiment.

Also in such a configuration, as illustrated in FIG. 14, the AC-side terminal voltage command of the power conversion unit 10 is corrected in the direction that suppresses a d-axis current error as described above. Hence, the stability of the d-axis current is increased.

In the first embodiment, a phase correction is performed on both of the dq coordinate converter 54 (the first calculator 69) and the AC voltage command Op (the second calculator 70). On the other hand, in the second embodiment, a phase correction is performed on the AC voltage command Op (the second calculator 70). The embodiments of the disclosure are not limited to them. For example, a third embodiment can be presented. In the third embodiment, a phase to be output to the dq coordinate converter 54 (the first calculator 69) (e.g., only this phase) is corrected.

As has been described above, low-frequency disturbance may occur due to the reactance component $L_{src}$ of the wiring, which exists on the path linking the three-phase AC power supply 2 and the power regeneration apparatus 1. According to the power regeneration apparatus 1 and the power conversion apparatus 5 according to the embodiments, it is possible to suppress the occurrence of such low-frequency disturbance extremely simply and effectively by high robust means.

A further effect and a further modification can be readily derived by those skilled in the art. For example, a modification includes a power conversion apparatus provided with a power regeneration apparatus and an inverter device as a matrix converter device that is characterized by AC-AC direct conversion. Hence, a wider range of aspects of the present disclosure is not limited to the specific details and the representative embodiments, which have been expressed and described as in above. Therefore, various alterations can be made without departing from a spirit or scope of the overall concept, which is defined by the accompanying claims and their equivalents.

If a phase is attempted to be synchronized with the three-phase AC power supply, the phase detecting unit 25 may follow the three-phase AC voltage in the vicinity of the filter 30 from the relation where the three-phase AC voltage in the vicinity of the filter 30 is detected. In this case, voltage is detected at a point that deviates from an actual three-phase AC power supply. Accordingly, if voltage disturbance occurs, the movement of voltages as indicated in Cases (1) to (4) illustrated in FIG. 8 is followed.

Moreover, the power regeneration apparatus of the present disclosure may be the following first to fifth power regeneration apparatuses. The first power regeneration apparatus includes: a power conversion unit that is connected to an AC power supply, and can regenerate electric power to the AC power supply side by converting DC power into AC power; AC reactors connected between phase terminals on an AC-side of the power conversion unit and the phases of the AC power supply; a voltage detecting unit for detecting an AC voltage supplied from the AC power supply and outputting an AC detection signal in accordance with the AC voltage on the AC reactor side; a phase detecting unit for detecting the phase of the AC power supply based on the AC detection signal; a drive control unit for controlling the power conversion unit based on a phase detection value detected by the phase detecting unit; and a reactive current detecting unit for detecting a reactive current component of a current flowing through the AC-side terminal of the power conversion unit, wherein the drive control unit has a phase correction section for correcting the phase detection value detected by the phase detecting unit based on the reactive current component.

In accordance with the second power regeneration apparatus in the first power regeneration apparatus, the voltage detecting unit is for detecting an AC voltage in the AC rectors or at the AC-side terminal of the power conversion unit, and outputting an AC detection signal in accordance with the AC voltage, and the phase detecting unit estimates the phase of the AC power supply based on the AC detection signal.

In accordance with the third power regeneration apparatus in the first or second power regeneration apparatus, the drive control unit has a control signal generation unit for generating a control signal that controls the power conversion unit, based on a phase detection value detected by the phase detecting unit, and a coordinate conversion unit for deriving an q-axis component and a d-axis component of a d-q axis rotating coordinate system synchronized with the AC power supply, based on a phase detection value detected by the phase detecting unit, and the phase correction section corrects the phase detection value output to the control signal generation unit or the phase detection value output to the coordinate conversion unit.

In accordance with the fourth power regeneration apparatus in the third power regeneration apparatus, the drive control unit has a d-axis current command unit for outputting a d-axis current command, and the phase correction section makes a correction based on a d-axis current deviation obtained by subtracting a d-axis current value derived by the coordinate conversion unit from the d-axis current command.

In accordance with the fifth power regeneration apparatus in the third or fourth power regeneration apparatus, the power conversion unit has a function of converting AC power supplied from the AC power supply into DC power, and the phase correction section has a sign switching unit for switching the positive and negative of the phase correction value between a case where the power conversion unit converts DC power into AC power to cause regenerative electric power and a case where the power conversion unit converts AC power into DC power.

Moreover, the power conversion apparatus of the present disclosure may include any one of the above first to fifth power regeneration apparatuses, and one or more inverter devices connected to a DC-side terminal of the power regeneration apparatus.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A power regeneration apparatus comprising:
 a power conversion unit connected to an AC power supply and having a function of converting DC power into AC power and regenerating the AC power to the AC power supply;
 an AC reactor connected between an AC-side terminal of the power conversion unit and the AC power supply;
 a voltage detecting unit for detecting an AC voltage supplied from the AC power supply and outputting an AC detection signal in accordance with the AC voltage;
 a phase detecting unit for detecting a phase of the AC power supply based on the AC detection signal;
 a drive control unit for controlling the power conversion unit based on a phase detection value detected by the phase detecting unit; and
 a reactive current component detecting unit for detecting a reactive current component of a current flowing through the AC-side terminal of the power conversion unit, wherein
 the drive control unit includes a phase correction section for correcting the phase detection value based on the reactive current component.

2. The power regeneration apparatus according to claim 1, wherein
 the voltage detecting unit outputs an AC detection signal in accordance with a detected AC voltage, and
 the phase detecting unit estimates a phase of the AC power supply based on the AC detection signal.

3. The power regeneration apparatus according to claim 2, wherein the voltage detecting unit detects an AC voltage on the AC power supply side of the AC reactor.

4. The power regeneration apparatus according to claim 2, wherein the voltage detecting unit detects an AC voltage in the AC reactor or at the AC-side terminal of the power conversion unit.

5. The power regeneration apparatus according to claim 1, wherein
the drive control unit includes
a control signal generation unit for generating a control signal that controls the power conversion unit, based on a phase detection value detected by the phase detecting unit, and
a coordinate conversion unit for converting a current value flowing through the AC-side terminal of the power conversion unit into a current value of a d-q axis rotating coordinate system, based on a phase detection value detected by the phase detecting unit, to derive a q-axis current value and a d-axis current value of the current, and
the phase correction section corrects at least one of the phase detection value output to the control signal generation unit and the phase detection value output to the coordinate conversion unit.

6. The power regeneration apparatus according to claim 5, wherein
the drive control unit includes a d-axis current command unit for outputting a d-axis current command, and
the phase correction section corrects the phase detection value based on a d-axis current deviation obtained by subtracting a d-axis current value derived by the coordinate conversion unit from the d-axis current command.

7. The power regeneration apparatus according to claim 5, wherein
the power conversion unit has a function of converting AC power supplied from the AC power supply into DC power, and
the phase correction section includes a sign switching unit for switching a positive and a negative of a phase correction value between a case where the power conversion unit converts DC power into AC power and a case where the power conversion unit converts AC power into DC power.

8. The power regeneration apparatus according to claim 7, wherein the phase correction section sets a sign of a phase correction value based on a sign of the q-axis current value.

9. A power conversion apparatus comprising:
the power regeneration apparatus according to claim 1; and
an inverter device connected to a DC-side terminal of the power regeneration apparatus.

* * * * *